United States Patent Office 2,973,649
Patented Mar. 7, 1961

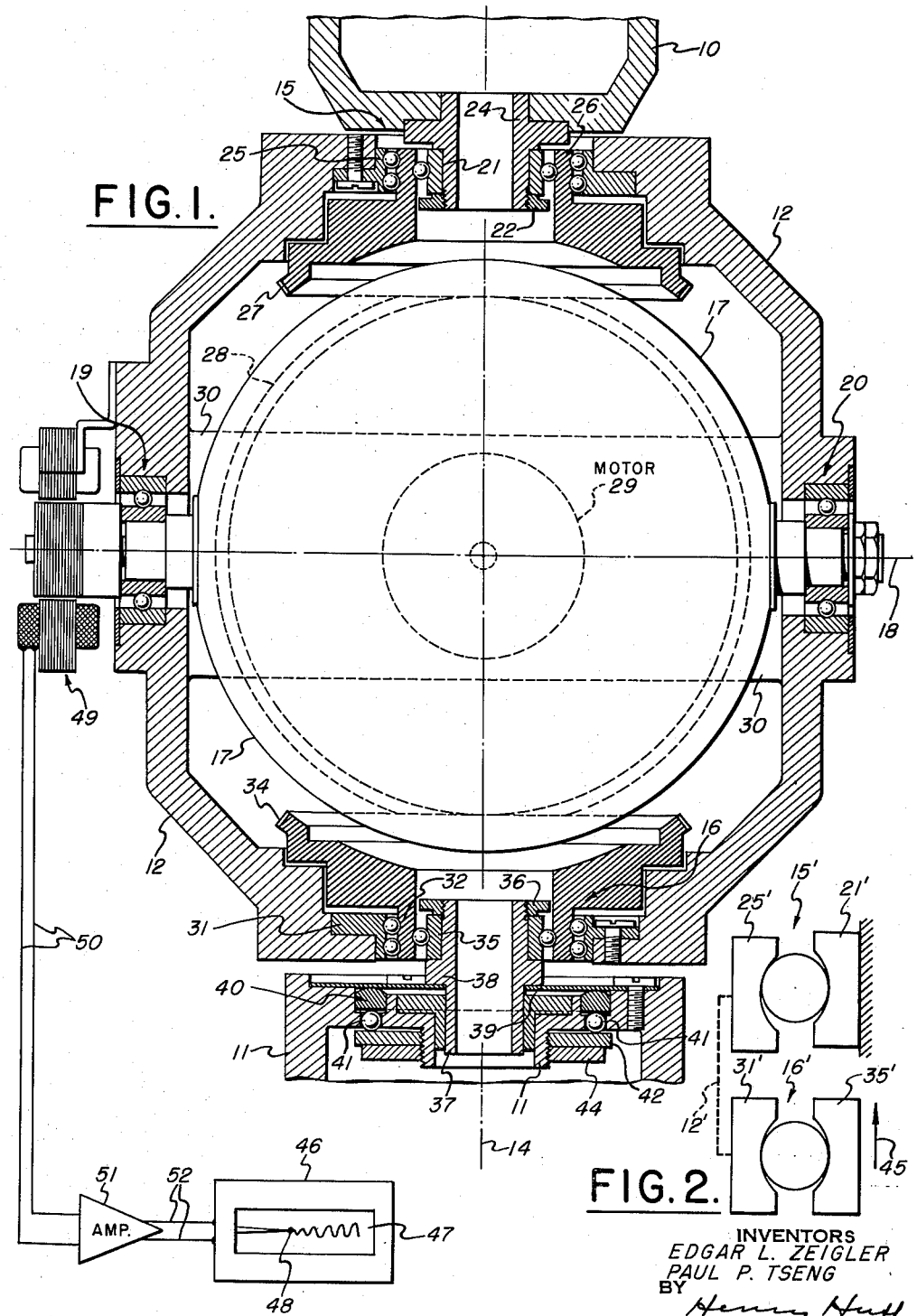

2,973,649

STRUCTURE AND METHOD FOR MOUNTING A VERTICAL GIMBAL

Edgar L. Zeigler, Glen Cove, and Paul P. Tseng, Williston Park, N.Y., assignors to Sperry Rand Corporation, Great Neck, N.Y., a corporation of Delaware Filed June 17, 1959, Ser. No. 821,050

9 Claims. (Cl. 74—5.0)

This invention relates to an improved structure for mounting a double ended vertical gimbal on the frame of a gyroscopic instrument where the support provided includes upper and lower ball type bearings and where one of the races of the bearings is adjustable along the axis of the gimbal with relation to the frame to distribute the load between the bearings. The load carried by the improved support mounting is provided by the gimbal and a gyroscopic rotor or rotor case element that is mounted on the gimbal with freedom about an axis normal to vertical gimbal axis by suitable spaced horizontal bearings.

The invention also concerns a method that is not restricted to use with the related mounting structure for controlling the relative distribution of the loading of the respective spaced vertical axis ball bearings. In accordance with the improved method the load provided by the gimbal and rotor case element is distributed equally between the bearings of the mounting to reduce the disturbing torque about the gimbal axis due to bearing friction to a minimum. In the practice of the method with upper and lower bearings having oppositely rotated intermediate ball races, the friction levels of the respective bearings are equal at such load distribution and the oppositely directed friction torques about the axis substantially cancel. This results in a substantial elimination of the effect of bearing friction in the instrument with regard to the vertical axis. Precession of the rotor case load element about its horizontal axis from this cause is substantially eliminated and the overall accuracy of the instrument is improved.

An object of the invention is to provide both a structure and method that improves the performance of a gyroscopic instrument by substantial elimination of the torque due to bearing friction in the spaced bearings provided for the vertical gimbal load element.

A feature of the invention resides in the provision of an elastic member, spring or flexible diaphragm in the mounting structure supporting the load and interconnecting an axially movable ball bearing race and fixed frame.

Another feature of the invention resides in the inclusion in the support mounting of a structural means settable with relation to the frame for positioning a movable ball race axially along the gimbal axis through the elastic member, spring or flexible diaphragm to distribute the load between the bearings.

Other objects, features and structural details of the invention will appear more fully from consideration of the following description in connection with the accompanying drawing wherein a preferred embodiment of the invention is illustrated.

In the drawing:

Fig. 1 is a schematic view showing an embodiment of the invention in which the gyroscopic instrument, per se, is a directional gyro illustrated in vertical section with some of the parts in elevation, and Fig. 2 is an enlarged sectional view of a representative pair of ball bearings providing a portion of the improved mounting structure utilized in explaining the distribution of the load between the vertical gimbal bearings.

The illustrative gyroscopic instrument shown in the drawing is a directional gyro having conventional frame, gimbal ring and rotor case parts. As represented, the fixed frame element of the instrument is formed of an upper part 10 and a base part 11 located in spaced relation. The frame components may be portions of an integral framework or portions attached to the inside walls of a suitable housing (not shown) for the instrument.

The gimbal 12 provides one of the load elements of the improved mounting. This element is a conventional double ended ring that is supported at its opposite ends on the frame with freedom about a vertical axis 14 by upper and lower ball bearings indicated at 15 and 16, respectively. The net frictional disturbing torque that is reduced or eliminated in accordance with the teaching of the present invention occurs about axis 14 with relative movement between the frame and vertical gimbal 12 due to the bearings 15 and 16 of the support structure.

As shown in Fig. 1, a rotor case 17 is supported on the gimbal 12 with freedom about a normally horizontal axis 18 by means of the respective spaced bearings 19 and 20. The case 17 of the gyroscopic instrument encloses a gyroscopic rotor (not shown) that is suitably spun about an axis that is mutually perpendicular to the gimbal axis 14 and the case axis 18. The rotor or rotor case 17 of the instrument constitutes an element that also exerts a load on the vertical axis bearings 15 and 16.

The load supporting, anti-friction, ball bearings 15 and 16 shown in the drawing are of the torque minimizing type shown and described in copending U.S. application S.N. 611,737, filed September 24, 1956 for anti-friction support mechanism for gyroscopic devices by Edgar L. Zeigler and Martin S. Klemes. As shown, the upper ball bearing 15 of the mounting means includes an inner race 21 that is fixed to the upper frame 10 by means of a lock nut 22 and cooperating stationary stub shaft 24 that is suitably secured to the frame 10. The outer race 25 of the bearing 15 is fixedly connected to the upper end of the double ended gimbal 12 by suitable screw fastenings. The intermediate race 26 of the bearing 15 is rotated about the axis 14 in accordance with the teaching of the heretofore identified application. As shown herein, ball race 26 is provided by the hub portion of a bevel gear 27 whose meshing gear 28 is driven by a reversible motor 29. The motor 29 and gear 28 are carried on the gimbal 12 on a fixed mounting plate 30 formed as a part of the gimbal. The fixed outer race 31 of the lower bearing 16 is fixedly connected to the lower end of the gimbal 12. The intermediate race 32 of the bearing 16 is provided by the hub portion of a second bevel gear 34 that also meshes with the driving gear 28. Operation of the motor 29 is controlled in accordance with the heretofore identified application so that the provided driving connection rotates the intermediate races 26 and 32 in opposite directions through a predetermined range of travel and periodically reverses the sense of the movement of the races. Accordingly, during half the cycle of the operation, race 26 is driven clockwise about axis 14 as the race 32 is driven counterclockwise. At the other half of the cycle, the relative rotations of the intermediate races are reversed. The described cyclic movements of the races occur when the gyroscopic instrument is operative and the rotor of the gyroscopic instrument is spinning. Motor 29, plate 30, and gearings 27, 28 and 34 provide additional loading for the bearings 15, 16 supporting the gimbal 12 about its vertical axis 14.

In accordance with the invention, one of the races of the bearings about the axis 14 is made adjustable along the gimbal axis to a position in relation to the other bearing races or with relation to the frame in which by the practiced method the considered load is equally distributed between the respective bearings. The method requires bearings. The method requires bearings with intermediate races having opposite rotations. Reduction of the disturbing torque is also effected by the improved support mounting where double race types of ball bearings are utilized and the total friction level about the axis is reduced by equal distribution of the load between the bearings. The axially movable bearing race of the arrangement is indicated at 35. As shown, the race 35 is secured by a nut 36 to a pintle 37 mounted in the base frame 11 to move along the axis 14. The pintle 37 includes a flange 38 whose undersurface engages an elastic member, spring or flexible diaphragm 39 that exerts a reactive supporting force on the gimbal 12 equal and opposite to the load. The flexible member shown is an annular spring with an inside rim connected to the pintle 37 and an outside rim connected to the base frame 11 by suitable fastening means. The diaphragm connected between the movable ball race 35 and frame 11 supports the load elements of the instrument.

The means for distributing the load between the bearings 15 and 16 is provided by cooperative annular ring 40, balls 41, adjustable nut 42 and lock nut 44. These parts with the ring 40 contacting or operatively connecting the spring member 39 are adjustable along the axis 14 with relation to the base frame 11. The ring 40 of the means fits in a circular groove in the frame 11 concentric to the axis 14 with its upper curved surface engaging the member 39 between its points of connection both with the frame and with the bearing race 35 through the pintle 37. The balls 41 of the provided arrangement are located in equidistantly spaced pockets in the base frame 11 and contact the undersurface of the ring 40 and uppersurface of the adjusting nut 42. The nut 42 is settable with relation to the frame to position the movable bearing race 35 axially through the elastic member 39 to distribute the load between the bearings. Nut 44 locks the nut 42 in the adjusted set position thereof in relation to the frame.

Fig. 2 illustrates an unbalanced loading condition for representative vertical axis bearings where the upper bearing 15' is more heavily loaded than the lower bearing 16'. To show this condition the gimbal or load race 25' of the ball bearing 15' is indicated as slightly dropped in relation to the ball race 21' fixed to the frame. To equalize the loading between the bearings, it is necessary in this instance to raise the adjustable race 35' of the lower ball bearing 16' in the direction of the arrow 45 so that the relative disposition of the races of the respective bearings becomes the same. This results in a slight change in the position of gimbal race 31' that through the gimbal connection 12' reduces the loading on the upper bearing 15' to the degree desired. Where the loading conditions are opposite to those shown, the adjustable race 35' is moved in the opposite direction to the arrow to remove the loading on bearing 16' and lower the gimbal 12' until the upper bearing 15' assumes its proper share of the load. In Fig. 1, the same result is obtained through the intermediate bearing races 32 and 26 of the respective bearings 16 and 15 and through the flexible diaphragm 39 engaged by the load distributing means. At the axial position of the movable race 35 where the load is equally distributed, the adjusted nut 42 is locked by turning the locking nut 44 on the base frame 11 against the nut 42.

The practice of the method assures that the adjustment and final setting of the movable race 35 along the axis 14 are accurate. In the method, the results of unequal loading are observed as precession of the rotor case 17 from a null condition about its horizontal axis. Disturbing net friction torques about axis 14 occur due to the difference in the friction level of the bearings 15 and 16 when the same are unequally loaded. During rotation of the intermediate races 26, 32 in a portion of the cyclic movements thereof where, for example, race 26 is moving clockwise and race 32 is moving counterclockwise, the net torque causes precession of the case 17 from null about axis in a given sense. The direction and extent of such precession is observed by the operator making the adjustment on a recorder 46 having a movable tape 47 and cooperating stylus 48 that provides a trace on the tape of the output of a conventional electrical pick-off 49 at the axis 18 of the instrument. As shown, the pick-off 49 is operatively connected to the recorder 46 by way of leads 50, a suitable amplifier 51 and leads 52. With the same loading, at the portion of the operating cycle of the intermediate races where the directions of movement are reverse to the heretofore given directions, the net torque reverses in direction about the axis 14 and the case 17 changes its sense of precession about the axis 18. The trace on the tape which is moved by a clock mechanism is accordingly a curve that, with respect to a reference line, follows the precession of the case 17 as it moves angularly from a null condition in both magnitude and sense about axis 18. The method is accordingly practiced with the instrument in operating condition with the rotor spinning and the intermediate races of the ball bearings rotating cyclically about the vertical gimbal axis 14. The method further requires the comparison of the disturbing torques about the gimbal axis by observation of an output in accordance with sense and magnitude of the precession of the rotor case from a null condition about its horizontal axis. With equal loading conditions for the respective bearings 15 and 16, the friction levels of the bearings are approximately the same and the torques of the oppositely rotating intermediate ball races substantially cancel during the cyclic movements thereof. Accordingly, in the practice of the method, the operator changes the position of one of the bearing races other than the intermediate races along the axis of the gimbal in relation to the other bearing races until the observed output is smoothed and the load is equally distributed between the bearings. This change or adjustment may be made by turning the nut 42 in Fig. 1 with relation to the frame 11 or otherwise setting the movable race axially in a manner not dependent on the structure shown until the curve of the recorder or other corresponding information observed indicates a minimum of precession of the case 17 about its horizontal axis 18.

While the invention has been described in its preferred embodiment, it is understood that the words which have been used are words of description rather than of limitation and that changes within the purview of the appended claims may be made without departing from the true scope and spirit of the invention in its broader aspects.

What is claimed is:

1. In a gyroscopic instrument having rotor and double ended gimbal load providing elements and a frame; means for mounting the load providing elements on the frame with the gimbal having freedom about a vertical axis including a first ball bearing having a race fixed to the frame and a race fixedly connected to one end of the gimbal, a second ball bearing having a race fixedly connected to the other end of the gimbal and a race movable with relation to the frame along the vertical axis, an elastic member between the axially movable bearing race and the frame exerting a reactive supporting force on the gimbal equal and opposite to the load provided by the load elements, and means settable with relation to the frame for positioning the movable bearing race axially through the elastic member to distribute the load provided by the load elements between the bearings.

2. In a gyroscopic instrument having rotor and double ended gimbal load providing elements and a frame;

means for mounting the load providing elements on the frame with the gimbal having freedom about a vertical axis including a first ball bearing having a race fixed to the frame and a race fixedly connected to one end of the gimbal, a second ball bearing having a race fixedly connected to the other end of the gimbal and a race movable along the vertical axis, a spring connected between the movable bearing race and frame supporting the load providing elements, and adjustable means for distributing the load provided by the load elements between the bearings operatively connecting the spring to axially position the movable bearing race with relation to the frame.

3. In a gyroscopic instrument having rotor and double ended gimbal load providing elements and a frame; means for mounting the load providing elements on the frame with the gimbal having freedom about a vertical axis including a ball bearing having a race fixed to the frame and a race fixedly connected to the upper end of the gimbal, a ball bearing having a race fixedly connected to the lower end of the gimbal and a race movable along the vertical axis, a spring between the movable bearing race and the frame exerting a reactive supporting force on the gimbal equal and opposite to the load provided by the load elements, and means for distributing the load provided by the load elements between the bearings operatively connecting the spring to adjust the movable bearing race axially with relation to the frame.

4. In a gyroscopic instrument having rotor and double ended gimbal load providing elements and a frame; means for mounting the load providing elements on the frame with the gimbal having freedom about a vertical axis including a ball bearing having a race fixed to the frame and a race fixedly connected to the upper end of the gimbal, a ball bearing having a race fixedly connected to the lower end of the gimbal and a race movable along the vertical axis, a load supporting flexible diaphragm connecting the movable bearing race and the frame, and a ring for distributing the load provided by the load elements between the bearings operatively connected to said diaphragm to adjust the movable bearing race axially with relation to the frame.

5. In a gyroscopic instrument having rotor and double ended gimbal load providing elements and a frame; means for mounting the load providing elements on the frame with the gimbal having freedom about a vertical axis including a first ball bearing having an inner race fixed to the frame, a rotatable intermediate race and an outer race fixed to one of the ends of the gimbal, a second ball bearing having an outer race fixed to the other end of the gimbal, a rotatable intermediate race and an inner race movable along the vertical axis, a spring between the movable inner bearing race and the frame exerting a reactive supporting force on the gimbal equal and opposite to the load provided by the load elements, means for distributing the load provided by the load elements between the bearings operatively connecting the spring to adjust the movable inner bearing race axially with relation to the frame, and means for rotating said intermediate bearing races.

6. In a gyroscopic instrument having rotor and double ended gimbal load providing elements and a frame; means for mounting the load providing elements on the frame with the gimbal having freedom about a vertical axis including a ball bearing having an inner race fixed to the frame, a rotatable intermediate race and an outer race fixed to the upper end of the gimbal, a ball bearing having an outer race fixed to the lower end of the gimbal, a rotatable intermediate race and an inner race movable along the vertical axis, a load supporting flexible diaphragm connecting the movable inner bearing race and frame, a ring for distributing the load provided by the load element between the bearings operatively connected to said diaphragm to adjust the movable inner bearing race axially with relation to the frame, and means for rotating said intermediate bearing races.

7. In a gyroscopic instrument, a fixed frame, a gimbal, paired upper and lower ball bearings supporting said gimbal on the frame with freedom about a vertical axis including a ball bearing having a race connected to the gimbal and a second race, a pintle movable on said frame along the gimbal axis having the second bearing race fixed thereto, an annular spring having an inside rim connected to the pintle and an outside rim connected to the frame, and an adjustable ring contacting the spring to position the pintle bearing race axially with relation to the frame.

8. In a gyroscopic instrument, a fixed frame, a gimbal, paired upper and lower ball bearings supporting said gimbal on the frame with freedom about a vertical axis including a ball bearing having an outer race fixed to the gimbal, a rotatable intermediate race and an inner race, a pintle movable on said frame along the gimbal axis having the inner bearing race fixed thereto, an annular spring having an inside rim connected to the pintle and an outside rim connected to the frame, an adjustable ring contacting the spring to position the pintle bearing race axially with relation to the frame, and means for rotating said intermediate bearing race.

9. A method of equalizing the load between the bearings in a gyroscopic instrument of the character including a vertical gimbal supporting a rotor case with freedom about a horizontal axis, a pair of spaced vertical axis gimbal bearings with inner, intermediate and outer ball races, and a driving connection between the intermediate races of the bearings for rotating the races in opposite directions through a predetermined range of travel and periodically reversing the sense of movement of the intermediate race rotations; comprising the steps operating the instrument and the driving connection to rotate the intermediate races of the bearings cyclically about the vertical gimbal axis, comparing the disturbing torques about the gimbal axis during the resulting rotation of the intermediate bearing races by observation of an output in accordance with the sense and magnitude of the precession of the rotor case from a null condition about its horizontal axis, and changing the position of one of the bearing races other than the intermediate races along the axis of the gimbal in relation to the other bearing races until the observed output is smoothed and the load is equally distributed between the respective bearings.

References Cited in the file of this patent

UNITED STATES PATENTS

| | | |
|---|---|---|
| 1,452,603 | Himes | Apr. 24, 1923 |
| 1,800,564 | O'Connor | Apr. 14, 1931 |
| 2,577,942 | Agins | Dec. 11, 1951 |
| 2,822,225 | Teufel | Feb. 4, 1958 |